(12) United States Patent
Brekke

(10) Patent No.: US 8,387,333 B2
(45) Date of Patent: Mar. 5, 2013

(54) STRUCTURAL SUPPORT DEVICE WITH WEB BRACE

(75) Inventor: Steve Brekke, Lakeview, MN (US)

(73) Assignee: MiTek Holdings, Inc., Wilmington, DE (US)

( * ) Notice: Subject to any disclaimer, the term of this patent is extended or adjusted under 35 U.S.C. 154(b) by 6 days.

(21) Appl. No.: 13/037,748

(22) Filed: Mar. 1, 2011

(65) Prior Publication Data

US 2012/0222382 A1    Sep. 6, 2012

(51) Int. Cl.
*E04B 1/38* (2006.01)
*F16B 5/00* (2006.01)

(52) U.S. Cl. ............ 52/702; 52/289; 52/712; 403/232.1

(58) Field of Classification Search .................... 52/702, 52/289, 283, 712, 301; 403/232.1
See application file for complete search history.

(56) References Cited

U.S. PATENT DOCUMENTS

| | | | |
|---|---|---|---|
| 3,036,347 A * | 5/1962 | Findleton | 403/217 |
| 4,353,664 A * | 10/1982 | Gilb | 403/232.1 |
| 4,422,792 A * | 12/1983 | Gilb | 403/232.1 |
| 4,423,977 A * | 1/1984 | Gilb | 403/232.1 |
| 4,560,301 A * | 12/1985 | Gilb | 403/232.1 |
| 5,217,317 A * | 6/1993 | Young | 403/232.1 |
| 5,457,928 A * | 10/1995 | Sahnazarian | 52/702 |
| 5,603,580 A * | 2/1997 | Leek et al. | 403/232.1 |
| 7,334,372 B2 * | 2/2008 | Evans et al. | 52/289 |
| 2002/0078656 A1 * | 6/2002 | Leek et al. | 52/702 |
| 2003/0009980 A1 * | 1/2003 | Shahnazarian | 52/712 |
| 2004/0129845 A1 * | 7/2004 | Whale et al. | 248/201 |
| 2004/0244328 A1 * | 12/2004 | Bak et al. | 52/712 |
| 2007/0294979 A1 * | 12/2007 | Lin et al. | 52/702 |
| 2008/0101855 A1 * | 5/2008 | Lin | 403/232.1 |
| 2011/0005145 A1 * | 1/2011 | Contasti | 52/98 |

OTHER PUBLICATIONS

USP Structural Connectors, USP Professional Design Manual and Product Catalog, 56th Edition, copyright 2010. "Foundation Anchors—FA3 Series"—p. 31.
USP Structural Connectors, USP Professional Design Manual and Product Catalog, 56th Edition, copyright 2010. "Foundation Anchors—ST Series"—p. 32.
USP Structural Connectors, USP Professional Design Manual and Product Catalog, 56th Edition, copyright 2010. "Foundation Straps—TA Series"—pp. 44-45.
USP Structural Connectors, USP Professional Design Manual and Product Catalog, 56th Edition, copyright 2010. "Post Beam Corner—PBC Series"—p. 56.
USP Structural Connectors, USP Professional Design Manual and Product Catalog, 56th Edition, copyright 2010. "Knee Braces—KVB & KBVI Series"—p. 82.
USP Structural Connectors, USP Professional Design Manual and Product Catalog, 56th Edition, copyright 2010. "Girder Tiedown—MUGT15"—p. 152.

(Continued)

*Primary Examiner* — Robert Canfield
*Assistant Examiner* — Babajide Demuren
(74) *Attorney, Agent, or Firm* — Senniger Powers LLP

(57) ABSTRACT

A structural support device for supporting a joist relative to a support, wherein the joist has a web and a bottom, may include a hanger assembly having a seat configured for resting the bottom of the joist thereon, a side portion extending therefrom, and a securing portion extending from the side portion for securing the device to the support, and a web brace assembly operably extending from the hanger assembly at a junction and configured for articulation between a pre-adjusted position and an adjusted position to adjustably engage and align with the web of the joist. A method of making and using are also provided.

16 Claims, 5 Drawing Sheets

OTHER PUBLICATIONS

USP Structural Connectors, USP Professional Design Manual and Product Catalog, 56th Edition, copyright 2010. "Floor Truss Clips—FTC Series"—p. 174.

USP Structural Connectors, USP Professional Design Manual and Product Catalog, 56th Edition, copyright 2010. "Concealed Stringer Hanger—CSH—TZ"—p. 189.

USP Structural Connectors, USP Professional Design Manual and Product Catalog, 56th Edition, copyright 2010. "Light Slope Hangers—LS Series"—p. 101.

USP Structural Connectors, USP Professional Design Manual and Product Catalog, 56th Edition, copyright 2010. "Slope/Skew Hangers—LSSH Series"—p. 136.

USP Structural Connectors, USP Professional Design Manual and Product Catalog, 56th Edition, copyright 2010. "Adjustable Rafter-To-Plate Connectors—TMP & TMPH Series"—p. 135.

USP Structural Connectors, USP Professional Design Manual and Product Catalog, 56th Edition, copyright 2010. "Framing Angles—A3, AC, JA, & MP Series"—pp. 65-66.

USP Structural Connectors, USP Professional Design Manual and Product Catalog, 56th Edition, copyright 2010. "Post Anchors—PA, PA(E), & PAU Series"—p. 49.

USP Structural Connectors, USP Professional Design Manual and Product Catalog, 56th Edition, copyright 2010. "Perlin Anchors—HPA, PA & PAI Series"—pp. 45-46.

* cited by examiner ns, or hanger brackets and more particularly hanger brackets for wood-framed construction.

STRUCTURAL SUPPORT DEVICE WITH WEB BRACE

FIELD OF THE DISCLOSURE

The present disclosure relates generally to supports, brackets, connectors, hangers, hanger brackets, and other devices for supporting, connecting, or coupling items and to methods of making and using the devices. More particularly, the present disclosure relates to hanger brackets and more particularly to hanger brackets for wood-framed construction. Still more particularly, the present disclosure relates to joist hanger brackets for connecting, supporting, and/or bracing the ends of joists.

BACKGROUND

Wood-framed construction often involves supporting beams or joists at their ends by framing the beams or joists into the side of a supporting member such as another beam, girder or ledger, for example. This is in contrast to, for example, situations where the beams or joists are rested on top of a supporting beam or girder. Where joists are framed into the side of a supporting member, hanger brackets, or joist hangers, are commonly used to support the joist off of the supporting member.

For purposes of stability, during construction and throughout the life of a structure, proper construction often provides for bracing the ends of a joist against lateral movement or tipping. Accordingly, designers and product suppliers often specify or recommend that a joist hanger be installed to fit tightly against the sides of the joist at the support location. In some circumstances full depth hangers may be specified such that the joist is supported for its full depth at the support location or at least at the top and bottom of the joist. In other circumstances, minimum ratios of hanger height to joist depth may be specified such that sufficient bracing is provided.

In the case of I-shaped joists, joist hangers may not fit tightly against the web of the joist. In these cases, designers and product suppliers may specify or recommend full depth-type hangers such that the top flange and bottom flange of the joists are prevented from moving laterally relative to one another and relative to the supporting beam. Alternatively, where a full depth hanger is not provided or desired, designers and product suppliers may specify or recommend that web stiffeners be provided to fill the gap between the web of the joist and the side of the hanger providing lateral support to the web. In addition, designers and suppliers may recommend that a minimum ratio of hanger height to joist depth also be maintained.

In still other circumstances, joists may be prone to web buckling due to one or a combination of factors including the slenderness ratio of the web (i.e., thickness/height), loading, or other factors. For overly slender or heavily loaded webs, designers or product suppliers may specify or recommend the use of web stiffeners for sandwiching the web and filling the gap between the web and the sides of the hanger thereby providing lateral support to the web. The web stiffeners in this circumstance may be required even where a full depth-type hanger is provided.

Web stiffeners can be cumbersome and add additional steps to the installation process. Pairs of stiffeners may need to be cut to length and height and suitable thicknesses may need to be provided to properly match the gap between the web and the side of the hanger. Once acquired and cut to length and height, these additional elements may need to be installed against the web of the joist at each end of the joist adding more elements to the connections. Commonly, a bay of a floor or roof framing plan may include a large array of joists and these additional steps can increase the time and cost of constructing the respective floor or roof.

SUMMARY

In one embodiment of the present disclosure, a structural support device for supporting a joist is provided. The joist may have a web and a bottom and the device may include a hanger assembly having a seat configured for resting the bottom of the joist thereon, a side portion extending therefrom, and a securing portion extending from the side portion for securing the device to the support. The device may also include a web brace assembly operably extending from the hanger assembly at a junction and configured for articulation between a pre-adjusted position and an adjusted position to adjustably engage and align with the web of the joist. Accordingly, the hanger disclosed herein may allow for web stiffeners to be omitted thereby saving the costs associated with acquiring, preparing, and installing them.

In another embodiment, a method of using a structural support device having a web brace assembly to secure a joist to the side surface of a support member and brace a web of the joist is provided. The method may include arranging the device on the side surface, securing the hanger to the side surface, positioning the joist in the hanger, and articulating the web brace assembly to an adjusted position to engage and align with the web of the joist.

In another embodiment, a method of making a structural support device having a web brace assembly may include manufacturing a blank from sheet material. The blank may have a hanger assembly portion and a web brace assembly portion connected to the hanger assembly portion at an adjustment bend line. The web brace assembly portion may be separated from the hanger assembly portion by a slot and the blank may have a first forming bend line passing across the blank. The method may also include providing a plurality of fastener receiving openings in the blank, providing a bend line defining element along the adjustment bend line, and bending the blank along the first forming bend line.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The present disclosure relates to connectors. In some embodiments, the connectors disclosed herein may be structural support devices such as hangers configured to support the end of a joist relative to a support beam, girder, ledger, or other support or support member. The hangers may also be configured to provide web bracing to the web of the joist at the support location. The web bracing may include opposing bendable portions that can be bent against the web of opposite sides of the joist web and sandwich the web therebetween. In the case of I-shaped joists, the bendable portions may allow for placement of the relatively wide flange portion in a hanger that has been previously secured to a support member. Placement of the relatively wide flange may be followed by bending the web bracing against the web. The bendable portions may further be configured to suitably engage and align with a given joist web at one of a plurality of positions throughout their operable range. As such, the bendable portions may accommodate varying thicknesses of joist webs so as to be useful for several joist types including I-joists and joists having a uniform thickness throughout their height. The hangers may be advantageous for providing bracing against tipping of the joist at the support where the top flange of the joist is not otherwise braced. The hangers may also be beneficial for providing bracing against web buckling for generally slender or heavily loaded webs. Web stiffeners may thus be omitted providing a more efficient solution than currently available.

With regard to fastening, mounting, attaching or connecting components of the present invention, unless specifically described as otherwise, conventional mechanical fasteners and methods may be used. Other appropriate fastening or attachment methods include adhesives, welding and soldering. Generally, unless otherwise indicated, the materials for making embodiments of the invention and/or components thereof may be selected from appropriate materials such as metal, metallic alloys, ceramics, plastics, etc. Unless otherwise indicated specifically or by context, positional terms (e.g., up, down, front, rear, distal, proximal, etc.) are descriptive not limiting. Same reference numbers are used to denote same parts or components.

Figure 1:
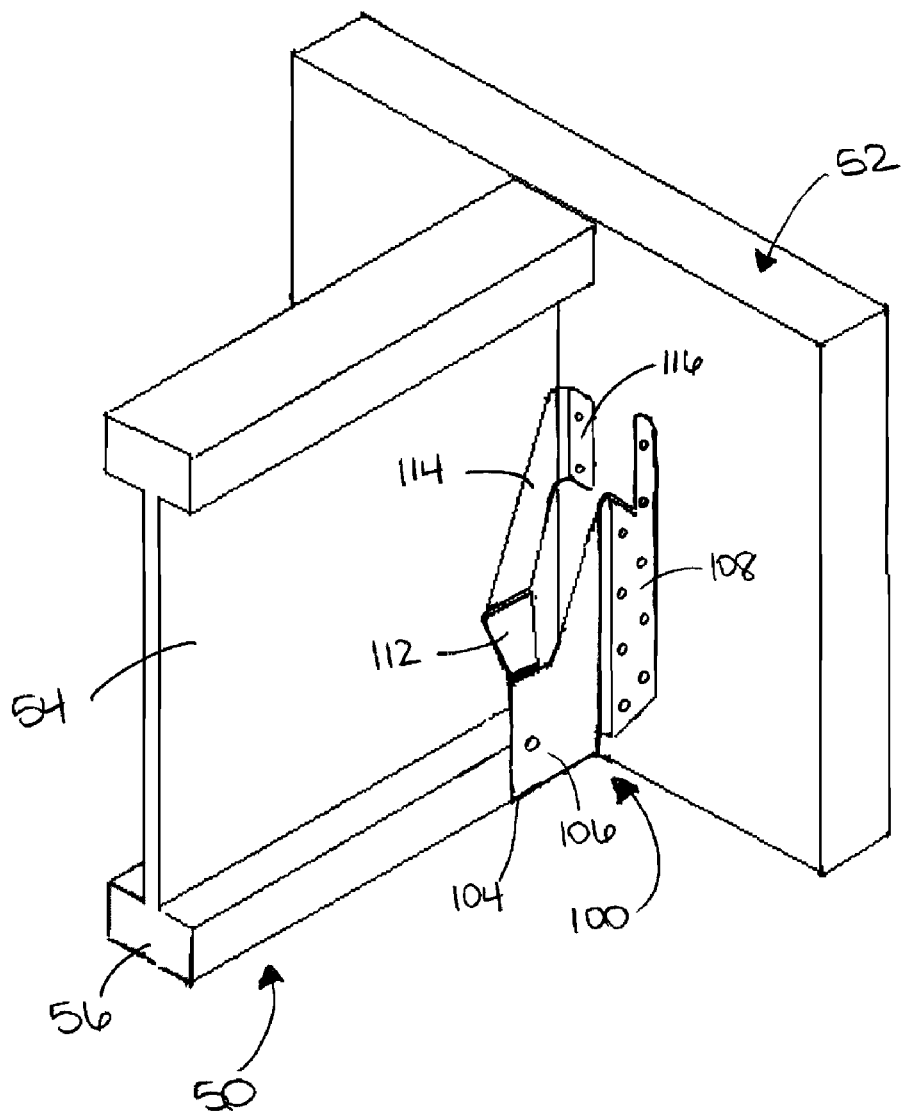
FIG. 1 is an in situ isometric view of a hanger according to certain embodiments.
Figure 2:
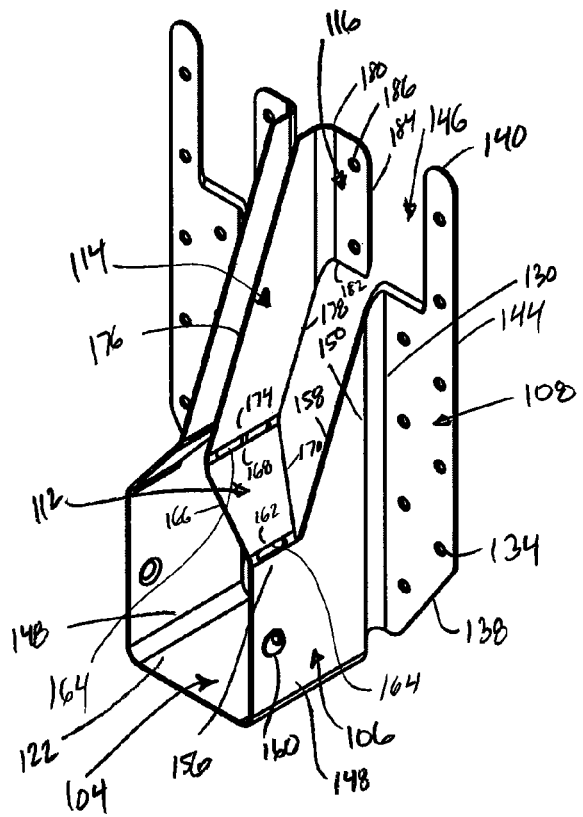
FIG. 2 is an isometric view of the hanger of FIG. 1 with the web brace assembly in an adjusted position.
Figure 3:
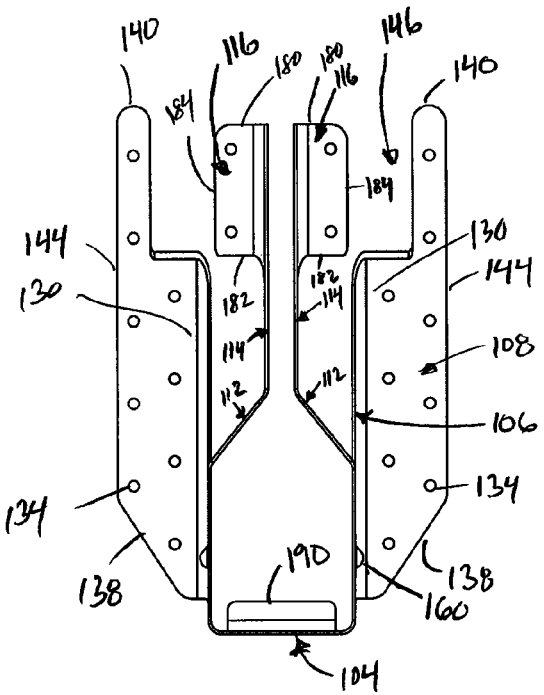
FIG. 3 is a front view thereof.

Referring now to FIGS. 1-3, several views of one embodiment of a structural support device in the form of a joist hanger 100 are shown. As shown in FIG. 1, the joist hanger 100 may be configured to support a joist 50 relative to a supporting beam, girder, or other member or building element 52, such as a ledger board, for example. Accordingly, the hanger 100 may include a hanger assembly 102 having a seat 104, a side portion 106, and a securing portion 108. The hanger 100 may also be configured to brace the web 54 of the joist 50 against lateral motion. Accordingly, the hanger 100 may include a web brace assembly 110 having an adjustment portion 112, an alignment portion 114, and a flange portion 116. The hanger 100 may be configured, as shown, as a face mount hanger or, alternatively, a top flange-type hanger, or other style hanger 100 may be provided. It is noted that while an I-joist is shown, the hanger 100 may be used with uniform width joists including dimensioned lumber and laminated veneer lumber, laminated strand lumber, and other engineered wood products. In the case of a uniform cross-section, references to the top and bottom flange of the joist may include portions of the respective top and bottom portion of, for example, a rectangular cross-section and references to the web of the joist may include the portion of the joist between the top and bottom flanges.

Figure 4:
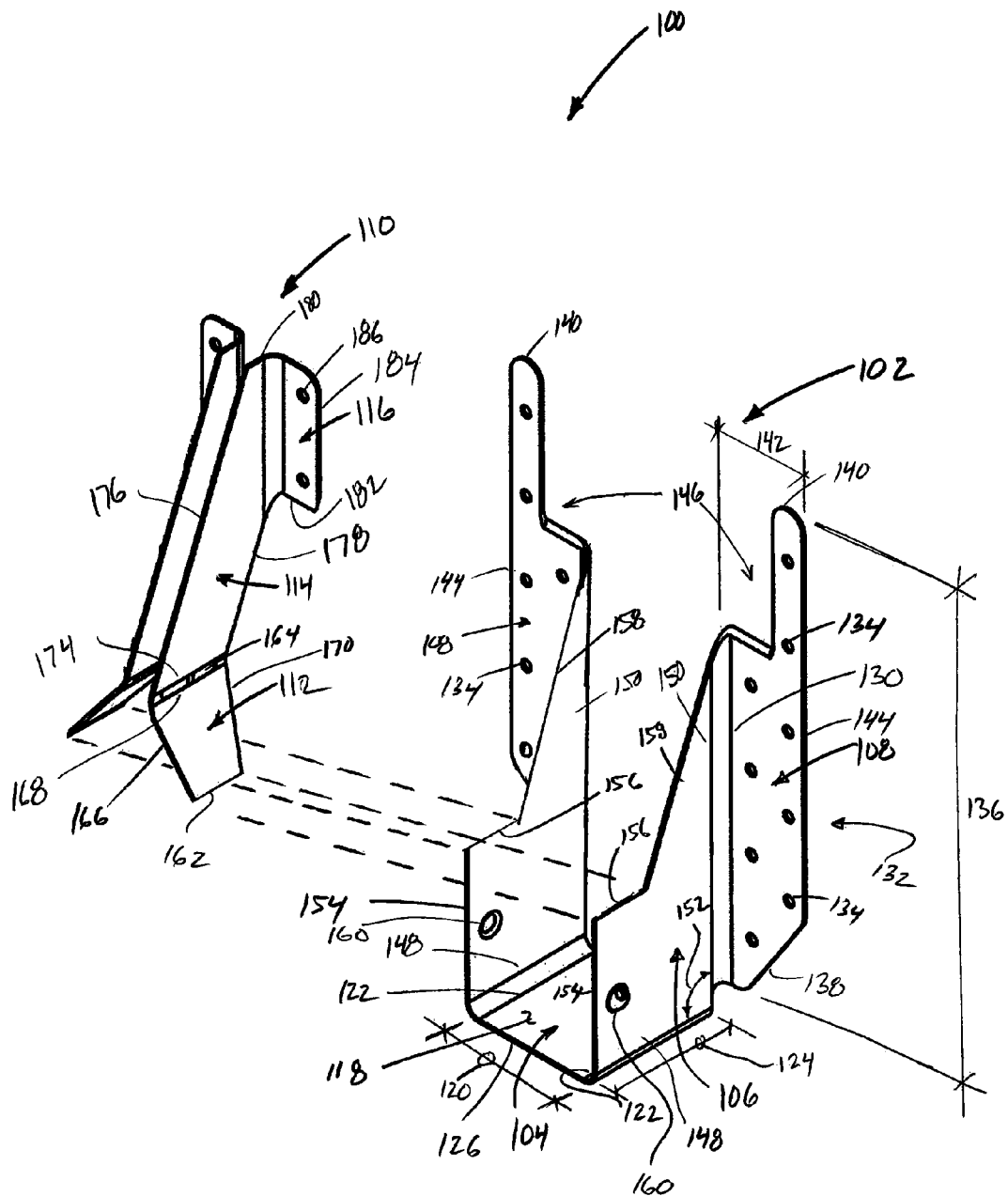
FIG. 4 is an exploded view of the hanger of FIGS. 1 and 2.

FIG. 4 shows the joist hanger 100 of FIGS. 1-3 in an exploded view. That is, the hanger assembly 102 and the web brace 110 assembly are separated for purposes of describing their respective parts or portions. Accordingly, the hanger assembly 102 including the seat 104, side portion 106, and securing portion 108 will now be described with reference to FIG. 4.

The seat 104 of the hanger assembly 102 may be configured for resting the bottom surface of the joist 50 thereon to provide support to the joist 50. As such, the seat 104 may have a receiving surface 118 having a width 120 extending between opposite seat side edges 122 as shown. The width 120 of the receiving surface 118 may be adapted for accommodating the width of the joist 50 or joist flange 56 and may match or be slightly larger than the width of the joist flange 56. The receiving surface 118 may also have a length 124 extending between a front seat edge 126 and a back seat edge 128 as shown. The length 124 of the receiving surface 118 may be selected to accommodate the reaction loads of the joist 50. That is, the length 124 of the receiving surface 118, when combined with the width 120, may provide a bearing area suitable for distributing the reaction load of the joist 50 sufficiently to provide suitable compressive bearing stresses on the bottom surface of the joist 50. The seat 118 may be in the form of a plate element extending across the bottom of the hanger assembly 102 between a pair of sidewalls of the side portion 106. Other shaped seats 104 may also be provided such as a block, ledge, or other member having a receiving surface 118.

The width 120 of the seat 104 may be configured to accommodate conventional dimensioned lumber. For example, common dimensioned lumber construction may include joists 50 having a nominal 2" width and an actual 1½" width. The width 120 of the seat 104 for use with dimensioned lumber may thus be approximately 1½" or slightly larger to provide some tolerance for placing the joist 50. Other widths 120 for accommodating multiple members such as approximately 3" or approximately 4½", or other multiples of 1½" may also be provided. Other widths 120 for dimensioned lumber having widths other than 2" nominal width may also be provided. Other widths for unconventional, rough sawn, or other lumbers may also be provided. The width 120 of the seat 104 may also be configured to accommodate I-joist flange widths. For example, a common I-joist may have a flange width of approximately 1¾", approximately 2¹⁄₁₆", approximately 2⁵⁄₁₆" or approximately 3½" for example. In these cases, the seat width 120 may have a similar or slightly wider width to provide a placing tolerance. As such, the width 120 of the seat 104 may range from approximately ½" to approximately 8". In other embodiments, the seat width 120 may range from approximately 1" to approximately 3½". In still other embodiments, the seat width 120 may be approximately 1¾". Other seat widths may be selected to suitably accommodate the width of the respective joist being supported. As such, widths outside the ranges mentioned may also be used. The seat length 124 may fall within similar ranges. The width 120 and length 124 of the seat 104 may also be similar to one another forming a substantially square seat 104 or the width 120 and length 124 may be different creating a generally rectangular seat 104.

Turning now to the securing portion 108 of the hanger assembly 102 and with continued reference to FIG. 4, the securing portion 108 may be configured to secure the hanger 100 to the supporting member 52 and prevent lateral motion of the hanger 100 across the surface of the supporting member 52. Accordingly, as shown, the securing portion 108 may be in the form of an attachment flange 108 adapted for placement against the side surface or face of the supporting member 52. Alternatively, however, the securing portion 108 may be in the form of a top mount tab extending from the side portion 106 of the hanger assembly 102 and adapted for placement across the top of the supporting member 52. Other types of securing portions 108 may also be provided. For purposes of discussion going forward and in light of the face mount type hanger shown, the securing portion 108 will be referred to as an attachment flange 108.

The attachment flange 108 may extend from the side portion 106 of the hanger assembly 102 at an attachment flange inner edge 130 and may be configured for placement against a side surface of the supporting member 52 and secured thereto. The attachment flange 108 may also be configured for transferring the reaction loads from the joist 50 into the supporting member 52. Accordingly, the attachment flange 108 may include a generally flat contacting surface 132 and may also include one or more openings 134 for receiving fasteners for holding the contacting surface 132 in contact with the side surface of the supporting member 52. Nails, screws, bolts, or other fasteners may be placed through the openings 134 and into the supporting member 52 to transfer, through shear, the reaction forces of the joist 50.

The attachment flange 108 may have a length 136 extending from a bottom end 138 to a top end 140 and the length 136, may be selected based on several factors. For example, the length 136 of the attachment flange inner edge 130 may be sized to transfer the reaction forces of the joist 50 from the side portion 106 to the attachment flange 108. For example, for a given thickness of material, the reaction force may be transferred through the attachment flange inner edge 130 in the form of a shear force along the inner edge 130. The length 136 of the attachment flange 108 may be selected such that sufficient material is provided along the inner edge 130 to transfer the shear. Consideration may also be given to the number of fasteners required to transfer the reaction forces from the hanger 100 to the supporting member 52 and opening number and spacing may, thus, also be a factor in the length 136 of the attachment flange 108. In addition, the depth of the joist 50 and the respective depth of the hanger 100 may also be a factor in the length 136 of the attachment flange 108. That is, where a particular ratio of hanger depth to joist depth is desired, the attachment flange length 136 may be selected based on the desired ratio. Additional factors may also be included. The attachment flange 108 may thus have a length 136 ranging from approximately 2" to approximately 24". In other embodiments, the length 136 may range from approximately 3" to approximately 12". In still other embodiments, the length 136 may range from approximately 4" to approximately 8". Still other lengths 136 may be selected as appropriate.

The attachment flange may have a width 142 extending between the attachment flange inner edge 130 and an attachment flange free edge 144. The width 142 may be selected based on several factors as well. The same or similar factors may be included in defining the width 142 of the attachment flange as are relevant for the length 136 of the attachment flange. For example, the number of openings 134 and the spacing therebetween may be considered when determining how wide the attachment flange 108 may be. In some embodiments, the attachment flange 108 may range from approximately ½" to approximately 6" wide. In still other embodiments, the attachment flange 108 may range from approximately ¾" to approximately 2" wide. In still other embodiments, the attachment flange 108 may range from approximately 1" to approximately 1½" wide. Still other widths 142 may be selected as appropriate.

As shown in FIG. 4, the bottom end 138 of the attachment flange 108 may be cut, sloped, or skewed to provide a clipped or mitered corner. A notch 146 may be provided in the opposite corner causing the upper end 140 and the inner edge 130 to return inward. As will be seen below, the notch 146 may be configured to provide the flange portion 116 of the web brace assembly 110 and thus may be sized and shaped the same or slightly larger than the flange portion 116 of the web brace assembly 110. In some embodiments, the flange portion 116 may have a width substantially equal to the width 142 of the attachment flange 108 and the notch 146 may thus be omitted. That is, the attachment flange 108 may have a length 136 that is truncated by the flange portion 116 of the web brace assembly 110 and the flange portion 116 of the web brace assembly 110 may be positioned along the end of the attachment flange 108 when the web brace assembly 110 is in a pre-adjusted position.

With continued reference to FIG. 4, the side portions 106 may be configured for transferring the reaction load of the joist 50 from the seat 104 to the securing portion 108 of the hanger assembly 102. More particularly, the side portions 106 may be adapted to receive forces from a seat side edge 122, pass the forces therethrough, and transfer the forces through shear to the attachment flange inner edge 130. Accordingly, the side portions 106 may include a tension element having a bottom edge 148 connected to the seat 104 along a seat side edge 122 and a rear edge 150 connected to the attachment flange 108 along the attachment flange inner edge 130. The bottom edge 148 of the side portion 106 may be substantially similar in length to the seat 104. The rear edge 150 of the side portion 106 may have length sufficient to transfer shear forces from the side portion 106 into the attachment flange 108. The rear edge 150 may thus have a length range similar to the range described with respect to the attachment flange 108 less the dimensions of the notch 146. Other lengths may also be provided.

As shown, the seat 104 and the attachment flange 108 may be oriented generally perpendicular to one another when viewed from the side causing the side portion 106 to have a generally right triangle type shape. That is, the inner angle 152 defined by the junction of the bottom edge 148 and the rear edge 150 may be approximately 90°. It is noted that the hanger 100 shown is configured for horizontally extending joists 50 and as such, the seat 104 is generally horizontal. In some cases, the joists 50 may be sloped and a sloping seat 104 may be provided. In these cases the inner angle 152 of the side portion 106 may be an obtuse angle or an acute angle as appropriate.

The remaining edges of the side portion 106 may be arranged as shown to include a front edge 154, bracing edge 156, and sloping edge 158. Alternatively, another arrangement of edges may be provided such as single sloping edge extending directly from the free ends of the bottom edge 148 and the rear edge 150. Other arrangements of edges may also be provided to provide an alternatively shaped side portion.

As shown, the front edge 154 may extend generally vertically and, where the seat 104 is flat or not sloped, the front edge 154 may also be generally perpendicular to the bottom edge 148. The front edge 154 may have a length generally similar to the length of the bottom edge 148 or the length of the seat 104. In some embodiments, the length of the front edge 154 may define a saddle depth that is configured to accommodate the thickness of the bottom flange of an I-joist. In some embodiments, the front edge 154 may, thus, have a length ranging from approximately 1¼" to approximately 1⅜". In some other embodiments, the length may have a broader range from approximately ½" to approximately 4". In still other embodiments, the length may range from approximately 1" to approximately 2". In still other embodiments, the length may be approximately 1½". Other suitable dimensions may be selected as appropriate.

The bracing edge 156 may extend generally horizontally and generally perpendicular to the front edge 154 as shown. The bracing edge 156 of the side portion 106 may have a length ranging from approximately ¼" to approximately 3" or from approximately ½" to approximately 1" or the length may be approximately ¾". Other brace edge lengths may be selected as appropriate. The orientation of the bracing edge 156 may define the pivotal motion of the web brace assembly 110 described below. That is, the bracing edge 156 may define an adjustment bend line or living hinge and thus define an axis about which the web brace assembly 110 may be bent to engage the web 54 of the joist 50. Where the web brace assembly 110 includes a flange portion 116 that engages the side surface of the supporting member 52, the bracing edge 156 may be advantageously arranged perpendicular to the side surface. This orientation may allow rotation of the web brace assembly 110 about the bracing edge 156 to cause the flange portion 116 to travel in an arcuate path along the side surface of the supporting member 52 and remain in contact therewith. As such, the web brace assembly 110 may be selectively adjusted to engage the web 54 of the joist 50 without concern for how the engagement of the flange portion 116 with the supporting member is affected.

The sloping edge 158 may extend generally diagonally from the bracing edge 156 to the free end of the rear edge 150 of the side portion 106 to complete the perimeter of the side portion 106. The sloping edge 158 may be arranged generally in line with an imaginary line connecting the free ends of the rear edge 150 and the bottom edge 148. As such, the front edge 154 and the bracing edge 156 may define a triangular tab extending upward from an otherwise generally triangular side portion 106. This arrangement of the sloping edge 158 may be advantageous for suitably transferring the load from the seat 104 to the attachment flange 108.

As shown in FIG. 4, the side portion 106 may include one or more openings 160 for receiving fasteners to secure the side portion 106 to the joist 50. As shown, the openings 160 may include guide elements for guiding the fasteners at an angle into the bottom flange or bottom portion of the joist 50 directed toward the supporting member. As such, when fasteners are advanced through the opening 160 and driven into the joist 50, the fastener may assist with preventing separation of the joist 50 from the supporting member 52 along the longitudinal direction of the joist 50.

Turning now to the web brace assembly 110, continued reference is made to FIG. 4. As shown, the web brace assembly 110 may operably extend from the bracing edge 156 of the side portion 106 of the hanger assembly 102. The web brace assembly 110 may be configured for articulation relative to the hanger assembly 102. In the embodiment shown a dual hinge assembly or dual articulating assembly 110 is shown for adjustably engaging and aligning with the web 54 of the supported joist 50. It is reiterated that this may be used with either I-joists or uniform width joists or joists having other cross-sectional shapes. The web brace assembly 110 may include an adjustment portion 112, an alignment portion 114, and a flange portion 116 and the dual articulation thereof may include bending the adjustment portion 112 about an axis defined by the bracing edge 156 and further bending the alignment portion 114 relative to the adjustment portion 112 to align with the surface of the web 54 of the joist 50. The articulation of the web brace assembly 110 may cause the flange portion 116 to travel along the surface of the supporting member 52 in an arcuate path and yet maintain its orientation. While a dual articulation assembly is shown, fewer or more bend lines may be provided to offer lesser or more degrees of articulation.

The adjustment portion 112 may extend from a junction with the hanger assembly 102. For example, the adjustment portion 112 may extend from a junction with the bracing edge 156 of the hanger assembly 102. Other junctions or attachment locations may be provided for the adjustment portion 112. The adjustment portion 112 may have an attachment edge 162 integral with the bracing edge 156. The attachment edge 162 may have a length substantially equal to the length of the bracing edge 156 or slightly smaller than the length of the bracing edge 156. The attachment edge 162 and bracing edge 156 may define an adjustment bend line or living hinge and a bend line defining element 164 may be provided. In some embodiments, the bend line defining element 164 may include a perforation extending along the attachment edge 162 and bracing edge 156. In other embodiments the defining element 164 may include a score mark, a series of perforations, or other material weakening feature that may cause the hanger 100 to bend along the bend line and focus the bending to the seam between the adjacent parts.

Figure 5:
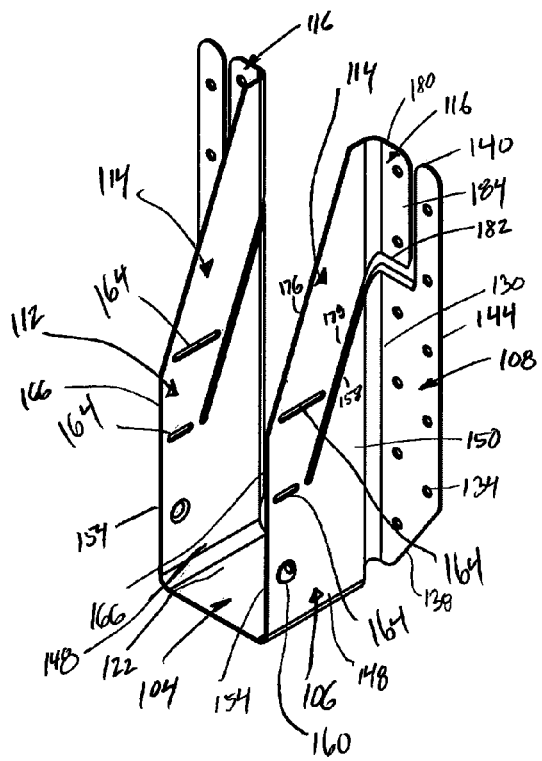
FIG. 5 is an isometric view of the hanger of FIG. 1 with the web brace assembly in a pre-adjusted position.
Figure 6:
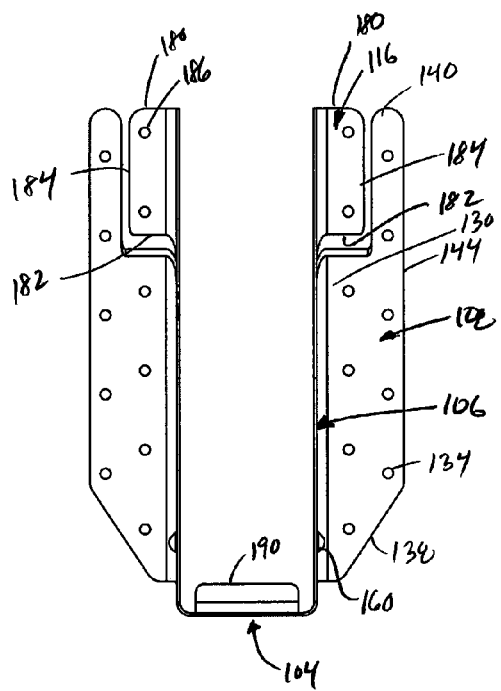
FIG. 6 is a front view thereof.

The adjustment portion 112 may have a front edge 166 having a length ranging from approximately ¼ of the width 120 of the seat 104 to approximately the full width 120 of the seat 104. In other embodiments, the front edge 166 may be approximately ¼ of the width 120 of the seat 104. Other front edge lengths may be provided and may be selected for suitable engagement of the web 54 of the joist 50 when the web brace assembly 110 is articulated. Still other lengths of the front edge may be selected as appropriate. The front edge 166 may be collinear with the front edge 154 of the side portion 106 when the web brace assembly 110 is in the pre-adjusted condition as shown in FIGS. 5 and 6.

Figure 7:
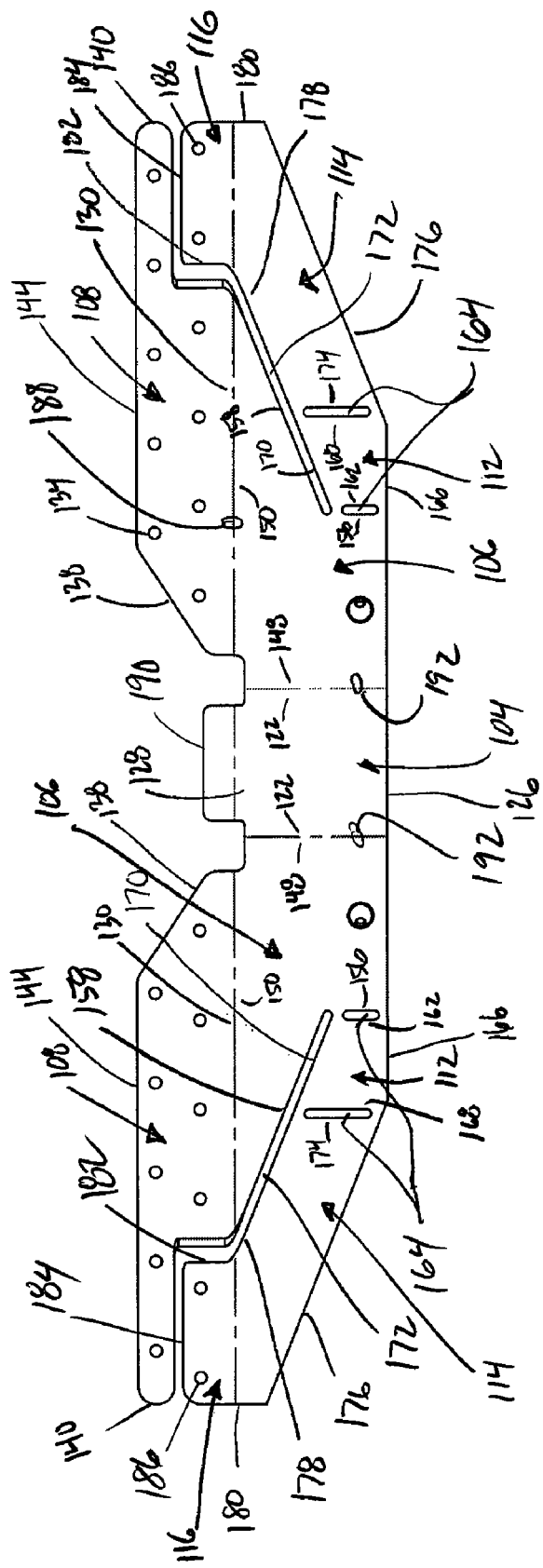
FIG. 7 is a pre-formed view of the hanger of FIG. 1.

The adjustment portion 112 may have an alignment edge 168 opposite the attachment edge 162. The alignment edge 168 may be substantially parallel to the attachment edge 162 and may be spaced from the attachment edge 162 a distance equal to the length of the front edge 166. The alignment edge 168 may have a length the same as or slightly larger than the attachment edge 162. As shown in FIGS. 5 and 7, the alignment edge 166 may have a length greater than the attachment edge 162 by a ratio defined by the sloping edge 158 of the side portion 106. That is, as shown in FIG. 7, the adjustment portion 112 may increase in width from the attachment edge 162 to the alignment edge 168 and the increase in width may be equal to the slope of the sloping edge 158 of the side portion 106 multiplied by the width of the adjustment portion 112. The alignment edge 168 may define an alignment bend line or living hinge for bendably pivoting or articulating the alignment portion 114 relative to the adjustment portion 112 to align the alignment portion 114 with the web 54 of a joist 50. As such, the alignment edge 168 may define an axis about which the alignment portion 114 may be pivotally adjusted. As with the bracing edge 156 of the side portion 106, the alignment edge 168 may be arranged to be substantially perpendicular to the side surface of the supporting member 52 allowing the flange portion 116 to translate along the surface of the supporting member 52 when the alignment portion 114 is pivoted. The alignment edge 168 may also be substantially parallel to the bracing edge 156.

With continued reference to FIG. 4, the adjustment portion 112 may have a rear edge 170 connecting the rear ends of the attachment edge 162 and the alignment edge 168. The rear edge 170 may have a slope substantially equal to the sloping edge 158 of the side portion 106. Accordingly, in the pre-formed position shown in FIG. 7, the rear edge 170 of the adjustment portion 112 may be substantially parallel to the sloping edge 158 of the side portion 106 and may be spaced therefrom to form a slot 172.

Turning now to the alignment portion 114, a bottom edge 174 may be provided integral with the alignment edge 168 of the adjustment portion 112. Like the integral bracing edge 156 and adjustment edge 162 above, the bottom edge 174 of the alignment portion 114 and the alignment edge 168 of the adjustment portion 112 may include a bend line defining element 164, such as a perforation, score mark, series of perforations, or other material weakening element for focusing bending at the seam between the adjustment portion 112 and the alignment portion 114. The bottom edge 174 may have a length substantially equal to the length of the alignment edge 168 or a slightly smaller or larger bottom edge 174 may be provided. The alignment portion 114 may also include two parallel extending front and rear edges 176, 178. The front and rear edges 176, 178 may extend from the bottom edge 174 at an angle matching that of the sloping edge 158 of the side portion 106 as well as the rear edge 170 of the adjustment portion 112, as shown in FIG. 7. The rear edge 178 of the alignment portion 114, like the rear edge 170 of the adjustment portion 112 may be spaced from the sloping edge 158 of the side portion 106 further defining the slot 172. The alignment portion 114 may include upper and lower returning edges 180, 182 extending from respective front and rear sloping edges 176, 178. The lower returning edge 182 may extend inwardly relative to the area of attachment flange 108. The upper and lower returning edges 180, 182 may be substantially parallel to the bottom edge 174 and may be spaced apart from one another to form the flange portion 116. The flange portion 116 may thus be positioned in the notch 146 formed in the attachment flange 108. The flange portion 116 may include an outer edge 184 connecting the upper and lower returning edges 180, 182. In the preformed condition shown in FIG. 7, the flange portion 116 may be arranged in the notch 146 of the attachment flange 108 and may include one or more openings 186 for securing the flange portion 116 to the supporting member 52.

While the hanger has been described with respect to one half of the hanger it should be appreciated that the hanger 100, as shown, may include a pair of attachment flanges, a pair of side portions and a pair of web brace assemblies. With continued reference to FIG. 7 and in comparison to FIG. 5, the method of forming the hanger 100 may be described. As shown in FIG. 7, the stamped, pressed, cut, or otherwise manufactured blank may include a plurality of forming bend lines or fold lines. As shown, a flange forming bend line 188 may extend generally longitudinally along the blank. The blank may be bent along the flange forming bend line 188 thereby forming the attachment flange 108 of the hanger assembly 102, the flange portion 116 of the web brace assembly 110, and a seat tab 190. As also shown, a pair of seat forming bend lines 192 may extend generally laterally across the blank. The blank may be bent along each of the seat forming bend lines 192 causing the side portions 106 of the hanger assembly 102 to bend relative to the seat 104 to form the saddle-shaped member of FIG. 5. In this condition, the hanger 100 is shown in a post-formed and pre-adjusted condition. That is, the hanger 100 is formed and ready for use, but has not yet been adjusted to brace the web 54 of a joist 50.

With continued reference to FIG. 5 and in comparison to FIGS. 1 and 2, one embodiment of a method of using, including hanging and adjusting, the hanger 100 may be described. As shown in FIG. 7, the saddle portion of the hanger 100 including the seat 104 and the side portions 106 are substantially open (i.e., not closed off by the web brace assembly 110). As such, the hanger 100 may be positioned with the attachment flange 108 placed against the side surface of the supporting member 52. The hanger 100 may be positioned to suitably vertically position the height of the joist 50 relative to the supporting member 52. That is, as shown in FIG. 1, where the joist depth is substantially similar to the supporting member depth, the hanger 100 may be positioned such that the seat 104 is in substantial alignment with the bottom of the supporting member 52. More particularly, the seat 104 of the hanger 100 may generally be placed a distance downward from the top of the supporting member 52 equal to the joist depth. Other arrangements and relationships of the supporting member 52 and the joist 50 may also be provided. For example, where the supporting member 52 has a depth greater than the depth of the joist 50, the seat 104 of the hanger 100 may be placed above the bottom of the supporting member 52. Other conditions where the top of the joist 50 and the top of the supporting member 52 are not in alignment may also be provided.

Once suitably vertically positioned, the hanger 100 may be secured to the supporting member 52 by placing fasteners through the openings 134 in the attachment flange 108. A joist 50 may be placed in the hanger 100 for support thereof and additional fasteners may be placed through the openings 160 in the side portion 106 to secure the joist 50 in the hanger 100. The web brace assembly 110 may then be articulated to engage and align with the web 54 of the joist 50. That is, the adjustment portion 112 may be pivoted about the bracing edge 156 of the side portion 106 until the alignment edge 162 of the attachment portion 112 engages the web 54 of the joist 50. The alignment portion 114 of the web brace assembly 110 may also be pivoted about the alignment edge 160 to align with the web 54 of the joist 50. Once dually articulated to engage and align with the web 54, fasteners may be placed through the openings 186 in the flange portion 116 of the web brace assembly 110 and into the supporting member 52 thereby securing the position of the web brace assembly 110 and laterally bracing the web 54 of the joist 50. In alternative embodiments, single articulation, three degrees of articulation, or additional degrees of articulation may also be provided to suitably engage the joist positioned in the hanger.

The hanger 100 described may be made from a suitable material. For example, the hanger 100 may be made from one or a combination of metals, plastics, or other materials. In some embodiments, the hanger 100 may be made from a light gauge steel. The hanger 100 may have a plate gauge ranging from approximately 28 gauge to approximately 8 gauge. In other embodiments, the hanger 100 may have a plate gauge ranging from approximately 24 gauge to approximately 12 gauge. In still other embodiments, the plate gauge may range from approximately 20 gauge to approximately 14 gauge. Still other gauge thicknesses may be selected as appropriate. The hanger 100 may also include a corrosion resistive coating. For example, the hanger 100 may include a G-60, G-90, or G-185 galvanized coating. Alternatively or additionally, the hanger 100 may include a moisture barrier coating such as an oil-based paint or other coating. Combinations of coatings and other coatings such as those described in U.S. Pat. No. 7,879,458 issued on Feb. 1, 2011 and entitled Construction Hardware and Method of Reducing Corrosion Thereof, may also be provided.

As shown and described with respect to FIG. 7, the hanger 100 may be formed from a flat blank scored, marked, punched, and/or cut as appropriate. In other embodiments, the hanger 100 may be a built-up member where the adjoining elements are connected to one another by means known to those in the art such as welding, bolting, or otherwise fastening. In these embodiments, for example, the bend lines may be omitted and the several parts may be secured to one another at suitable angles. For example, overlapping tabs may be provided and may be spot welded to secure portions of a given assembly or hanger to one another.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, including preferred embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A structural support device for supporting a joist relative to a support, the joist having a web and a bottom, the device comprising:
   a hanger assembly comprising:
      a seat configured for resting the bottom of the joist thereon;
      a side portion extending from the seat; and
      a securing portion extending from the side portion for securing the device to the support; and
   a web brace assembly operably extending from the hanger assembly at a junction and configured for articulation between a pre-adjusted position and an adjusted position to adjustably engage and align with the web of the joist and to engage and align with the support.

2. The device of claim 1, wherein the junction comprises an adjustment bend line and the web brace assembly is operable by bending about the adjustment bend line relative to the hanger assembly to adjustably engage the web.

3. The device of claim 2, wherein the web brace assembly further comprises an alignment bend line configured for adjustably aligning a portion of the web brace assembly with a surface of the web.

4. The device of claim 3, wherein the support includes a side surface and the adjustment bend line is arranged substantially perpendicular to the side surface of the support.

5. The device of claim 4, wherein the alignment bend line is arranged substantially perpendicular to the side surface of the support.

6. The device of claim 5, wherein the web brace assembly further comprises a flange portion configured for secured attachment to the support.

7. The device of claim 6, wherein the flange portion of the web brace assembly is configured for arrangement adjacent the side surface of the support in the pre-adjusted position and the adjusted position.

8. The device of claim 3, wherein the web brace assembly comprises:
   an adjustment portion secured to the hanger assembly at the adjustment bend line and for controlling the lateral travel of the web brace assembly;
   an alignment portion secured to the adjustment portion at the alignment bend line and for adjustable adjacent alignment with a side surface of the web; and
   a flange portion extending from the alignment portion for securing the web brace assembly to the support.

9. The device of claim 8, wherein the adjustment portion is rotationally operable via bending about a first axis defined by the adjustment bend line.

10. The device of claim 9, wherein the alignment portion is rotationally operable via bending about a second axis defined by the alignment bend line.

11. The device of claim 10, wherein the support includes a side surface and the flange portion is translatably operable adjacent the side surface of the support in an arcuate path.

12. A method of using a structural support device having a web brace assembly to secure a joist to the side surface of a support member and brace a web of the joist, the method comprising:
   arranging the device on the side surface;
   securing the device to the support member;
   positioning the joist in the device;
   articulating the web brace assembly to an adjusted position to engage and align with the web of the joist; and
   securing the web brace assembly in the adjusted position directly to the support member.

13. The method of claim 12, wherein the web brace assembly includes an adjustment portion and articulating the web brace assembly includes bending the adjustment portion toward the web of the joist to engage the web of the joist.

14. The method of claim 13, wherein the web brace assembly includes an alignment portion and articulating the web brace assembly further comprises aligning the alignment portion with the web of the joist.

15. A structural support device for supporting a joist relative to a support, the joist having a web and a bottom, the device comprising:
   a hanger assembly comprising:
      a seat configured for resting the bottom of the joist thereon;
      a side portion extending from the seat; and
      a securing portion extending from the side portion for securing the device to the support; and
   a web brace assembly operably extending from the hanger assembly at a junction and configured for articulation between a pre-adjusted position and an adjusted position to adjustably engage and align with the web of the joist, the web brace assembly comprising a flange portion configured for secured attachment to the support, wherein the support includes a side surface and the flange portion is translatably operable adjacent the side surface of the support in an arcuate path.

16. The device of claim 1 in which the web brace assembly comprises an adjustment portion, an alignment portion, an adjustment bend portion between the adjustment portion and the remainder of the structural support device and an alignment bend between the adjustment portion and the alignment portion, the adjustment bend portion being spaced apart from the alignment bend portion.

* * * * *